(12) United States Patent
Li et al.

(10) Patent No.: US 10,714,721 B2
(45) Date of Patent: Jul. 14, 2020

(54) SECONDARY BATTERY

(71) Applicant: Contemporary Amperex Technology Co., Limited, Ningde, Fujian (CN)

(72) Inventors: Quankun Li, Fujian (CN); Pinghua Deng, Fujian (CN); Peng Wang, Fujian (CN); Kai Wu, Fujian (CN); Yongshou Lin, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 87 days.

(21) Appl. No.: 15/594,684

(22) Filed: May 15, 2017

(65) Prior Publication Data

US 2017/0331090 A1    Nov. 16, 2017

(30) Foreign Application Priority Data

May 16, 2016   (CN) .......................... 2016 1 0324247

(51) Int. Cl.
| | |
|---|---|
| *H01M 2/12* | (2006.01) |
| *H01M 10/04* | (2006.01) |
| *H01M 2/14* | (2006.01) |
| *H01M 2/36* | (2006.01) |
| *H01M 2/18* | (2006.01) |
| *H01M 2/02* | (2006.01) |

(52) U.S. Cl.
CPC ........... *H01M 2/1264* (2013.01); *H01M 2/12* (2013.01); *H01M 2/14* (2013.01); *H01M 2/18* (2013.01); *H01M 2/36* (2013.01); *H01M 10/0431* (2013.01); *H01M 2/0287* (2013.01)

(58) Field of Classification Search
None
See application file for complete search history.

(56) References Cited

U.S. PATENT DOCUMENTS

| | | | | |
|---|---|---|---|---|
| 5,354,628 A | * | 10/1994 | Watanabe | H01M 2/1241 429/101 |
| 6,664,006 B1 | * | 12/2003 | Munshi | H01M 4/13 29/623.1 |
| 8,871,369 B2 | * | 10/2014 | Shimizu | H01M 2/1252 429/53 |
| 2007/0117011 A1 | * | 5/2007 | Myerberg | B32B 15/017 429/164 |

(Continued)

FOREIGN PATENT DOCUMENTS

WO   WO 2016/067510   *  5/2016   ............ H01M 10/04

*Primary Examiner* — Amanda J Barrow

(57) ABSTRACT

The present invention provides a secondary battery including: a housing, the housing being provided with an explosion proof valve at a bottom thereof, a cell pallet received in the housing and located at a bottom of the housing, the cell pallet being provided with a first through-hole and at least one groove, the first through-hole being aligned with the explosion proof valve and extending through the cell pallet to communicate a space above the cell pallet and a space below the cell pallet, the at least one groove being provided on an upper surface and/or a lower surface of the cell pallet, and the first through-hole communicating with at least one side edge of the cell pallet through the at least one groove; a bare cell received in the housing and seated on the cell pallet; and a top cover assembled to a top side of the housing.

8 Claims, 10 Drawing Sheets

(56) References Cited

U.S. PATENT DOCUMENTS

| | | | |
|---|---|---|---|
| 2011/0020674 A1* | 1/2011 | Fujita | H01M 2/1223 |
| | | | 429/53 |
| 2011/0269000 A1* | 11/2011 | Suzuki | H01M 2/1241 |
| | | | 429/56 |
| 2015/0295217 A1* | 10/2015 | Kwak | H01M 2/18 |
| | | | 429/146 |
| 2017/0098808 A1* | 4/2017 | Guen | H01M 2/04 |
| 2017/0317326 A1* | 11/2017 | Fujikawa | H01M 2/0413 |

* cited by examiner

SECONDARY BATTERY

CROSS-REFERENCE TO RELATED APPLICATIONS

The present application claims priority to Chinese application number CN 201610324247.8 filed on May 16, 2016, which is incorporated by reference herein in its entirety.

FIELD OF THE INVENTION

The present invention generally relates to energy storage devices and, more particularly, relates to a secondary battery.

BACKGROUND OF THE INVENTION

At present, a power battery (secondary battery) generally has a hard shell structure. The bare cell has a winding or laminated structure which includes anode and cathode plates and an insulating film interposed between the anode and cathode plates. As well known in the art, the winding bare cell generally has a radius of curvature in the direction of winding, and the surface where the anode and cathode tabs are located and the surface opposite to the tabs are non-rounded. The bare cell having a laminated structure has no rounded corners.

Currently, most power batteries are packaged with the two arcs of the bare cell facing the two sides of the housing, the tabs facing the top of the housing, and the surface opposite to the tabs facing the bottom of the housing. However, since the bottom of the housing is usually rounded, when the surface without round corners of the bare cell faces the bottom of the housing, it will interfere with the rounded corners around the bottom of the housing, resulting in deformation of the bare cell due to squeeze, and sometimes even resulting in short-circuit of the secondary battery when the anode and cathode plates are squeezed to contact with each other.

In addition, for the safety performance of a battery module, a power battery has installed an explosion proof valve at the bottom of the housing. The conventional power battery has only a thin insulating film for separating the bare cell from the bottom of the housing, and the bare cell almost directly contact the bottom of the housing. When the air pressure inside the bare cell causes the explosion proof valve to open during the safety performance test, such as nail penetration test, the internal pressure of the battery will still increase rapidly because there is no effective channel to guide the gas inside the bare cell to the explosion proof valve, which will lead to explosion of the housing. At the same time, the gas emitted from the explosion proof valve will carry a large amount of sparks and electrolyte, which will lead to fire after eject from the housing and mixes with air.

Furthermore, the conventional secondary battery is manufactured by injecting electrolyte into the cell from the top of the secondary battery. Part of the electrolyte is infiltrated to the anode and cathode plates through the top of the bare cell, but most of the electrolyte is directly deposited on the bottom of the housing. However, since the bottom of the bare cell is substantially in contact with the bottom of the housing, it is difficult for the electrolyte to infiltrate the anode and cathode plates upwardly, which will result in low injection efficiency.

In view of the foregoing, what is needed, therefore, is to provide a secondary battery which can solve the problems as discussed above.

SUMMARY OF THE INVENTION

One object of the present invention is to provide a secondary battery provided with a cell pallet capable of guiding the electrolyte and the gas while avoiding interference between the bottom of the bare cell and the bottom of the housing, so as to prevent explosion of the secondary battery caused by poor air flow and improve the injection efficiency of the electrolyte.

According to one embodiment of the present invention, a secondary battery includes:

a housing, the housing being provided with an explosion proof valve at a bottom thereof;

a cell pallet received in the housing and located at a bottom of the housing, the cell pallet being provided with a first through-hole and at least one groove, the first through-hole being aligned with the explosion proof valve and extending through the cell pallet to communicate a space above the cell pallet and a space below the cell pallet, the at least one groove being provided on an upper surface and/or a lower surface of the cell pallet, the first through-hole communicating with at least one side edge of the cell pallet through the at least one groove;

a bare cell received in the housing and seated on the cell pallet; and a top cover assembled to a top side of the housing.

Preferably, the cell pallet further defines a second through-hole which is not aligned with the explosion proof valve, the second through-hole extends through the cell pallet to communicate the space above the cell pallet with the space below the cell pallet, and the second through-hole communicates with at least one side edge of the cell pallet through the at least one groove.

Preferably, the second through-hole communicates with the first through-hole through the at least one groove.

Preferably, the first through-hole is a through-hole aligned with the explosion proof valve, or a plurality of sieve openings aligned with the explosion proof valve.

Preferably, the at least one groove comprise a groove defined in the lower surface of the cell pallet and covering the whole explosion proof valve, two ends of the groove communicate with two longer side edges of the cell pallet, respectively.

Preferably, the at least one groove includes a plurality of grooves jointly communicating the four side edges of the cell pallet with the first through-hole.

Preferably, at least one side edge of the cell pallet is provided with a notch communicating the space above the cell pallet and the space below cell pallet.

Preferably, the secondary battery further includes an insulating film for separating the bare cell from the housing, a bottom of the insulating film is provided with a through opening, the cell pallet is interposed between the insulating film and the housing and serves as a support for the insulating film and the bare cell enclosed in the insulating film.

Preferably, the cell pallet is an integral component made from a same material or an assembly including separate subassemblies made from different materials, the assembly includes an explosion proof component aligned with the explosion proof valve at the middle thereof and two support components located at two ends of the explosion proof component, the explosion proof component is made from high-temperature resistant materials, and the support component is made from plastic materials.

Preferably, the bottom surface of the housing is provided with a convex hull extending towards the cell pallet, and an explosion proof valve hole is defined in the middle of the convex hull.

Compared with the prior art, the secondary battery according to the present invention can prevent the bottom of the bare cell from interfering with the bottom of the housing effectively, obtain desirable airflow guiding effect, provide a channel of electrolyte infiltration to the anode and cathode plates, and improve the injection efficiency.

BRIEF DESCRIPTION OF THE DRAWINGS

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention, in which.

DETAILED DESCRIPTION OF THE INVENTION

Figure 1:
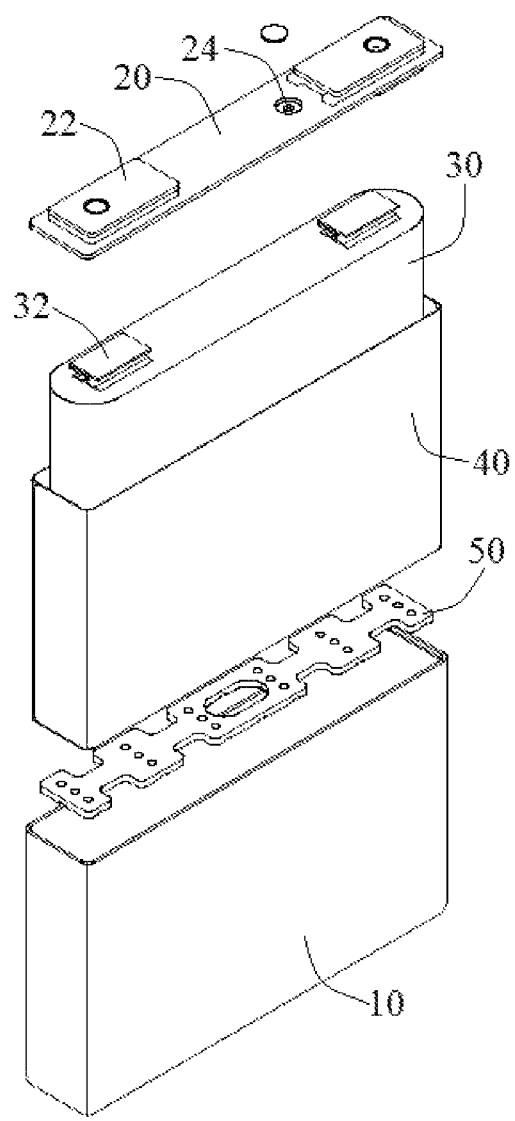
FIG. 1 depicts an exploded view of a secondary battery according to one embodiment of the present invention.
Figure 2:
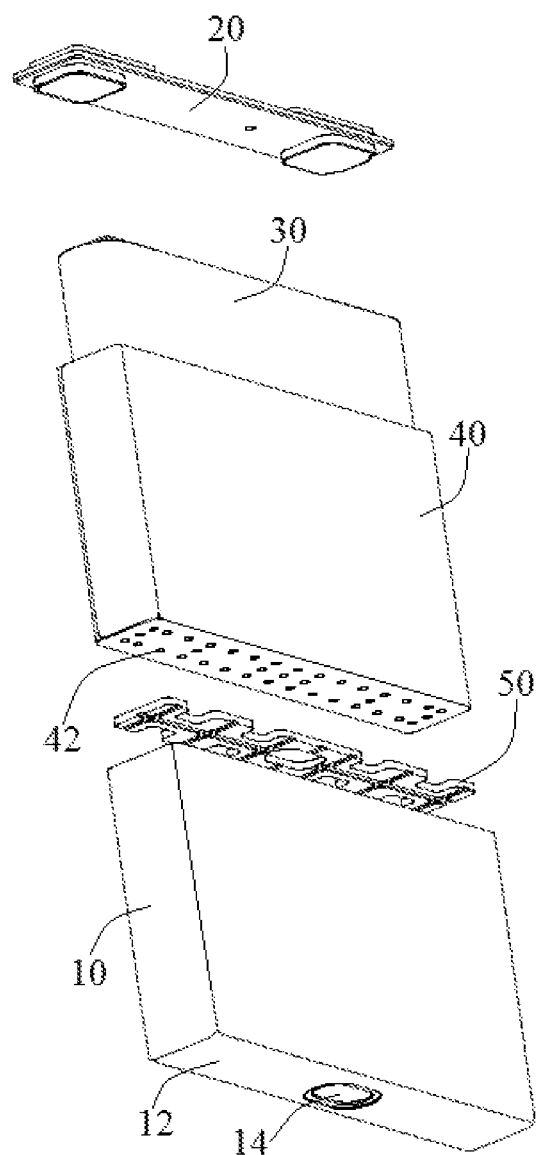
FIG. 2 depicts another exploded view of the secondary battery according to one embodiment of the present invention.
Figure 3:
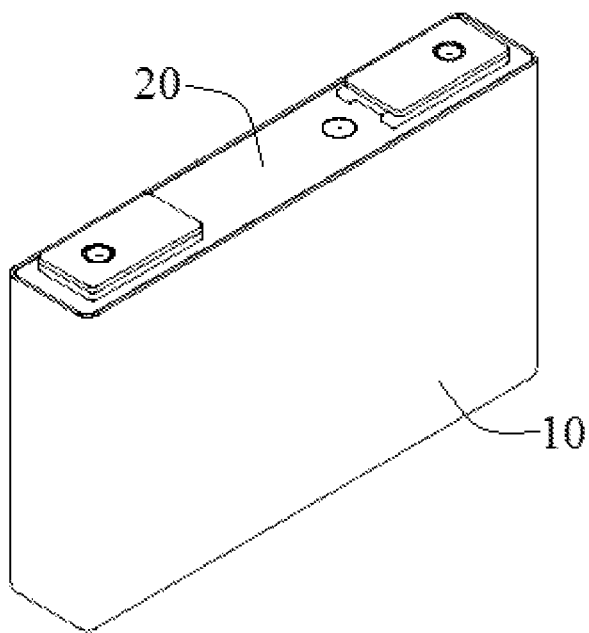
FIG. 3 depicts an assembled view of the secondary battery according to one embodiment of the present invention.
Figure 4:
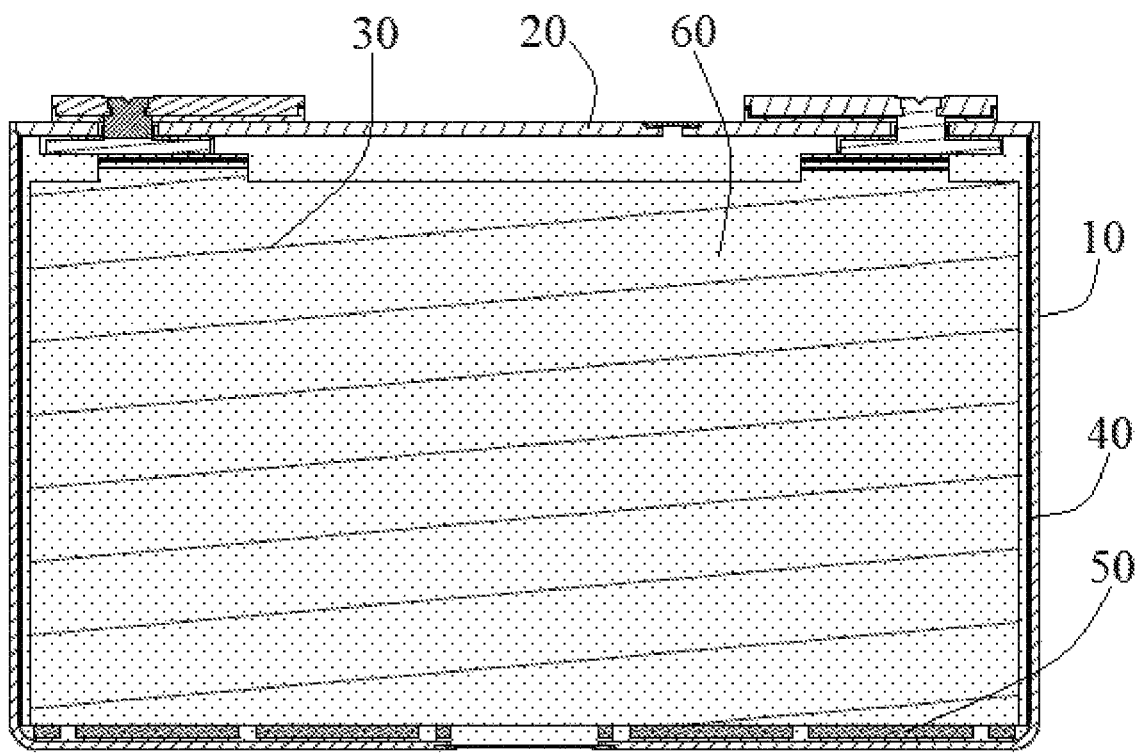
FIG. 4 depicts a cross-sectional view of the secondary battery according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Referring to FIGS. 1 to 4, a secondary battery according to one embodiment of the present invention includes a housing 10, a cell pallet 50 received in the housing and seated at a bottom of the housing 10, a bare cell 30 enclosed by an insulating film 40 positioned on the cell pallet 50, electrolyte 60 filled in the housing 10, and a top cover 20 assembled to a top portion of the housing 10.

The bottom of the housing 10 has four rounded corners. An explosion proof valve hole is provided on the bottom surface 12 of the housing 10. An explosion proof valve 14 is assembled in the explosion proof valve hole. According to a preferred embodiment of the present invention, the explosion proof valve 14 is seated in the middle of the bottom surface 12. The top cover 20 is provided with a positive and a negative column 22. The top cover 20 defines a sealable injection hole 24 therein.

Since the bare cell 30 has a winding structure, both sides in the width direction thereof are arc-shaped, and the top and bottom surfaces of the bare cell 30 in the height direction are flat or nearly flat. Positive and negative tabs 32 are mounted on the top of the bare cell 30 and extend outwardly from the top surface of the bare cell 30.

The insulating film 40 is configured to separate the bare cell 30 from the housing 10. The insulating film 40 has a shape substantially the same as that of the housing 10 but has a slightly smaller size. The bare cell 30 is enclosed in the insulating film 40. The bare cell 30 enclosed by the insulating film 40 is then assembled into the housing 10. The bottom of the insulating film 40 is provided with a number of through openings 42 through which the gas and the electrolyte 60 can flow.

The cell pallet 50 is seated at a bottom of the housing 10 and has a thickness of 0.3 to 5 mm. The cell pallet 50 is preferably made from insulating materials. The cell pallet 50 is set between the insulating film 40 and the housing 10, so as to support the bare cell 30 and the insulating film 40 as well as effectively prevent the insulating film 40 and the housing 10 from interfering with the rounded corners of the bottom of the housing 10. The cell pallet 50 is made from insulating materials which are resistant to electrolyte, such as PP, PE, PET, PPS, teflon, stainless steel, aluminum. Among them, plastic materials, such as PP, PE, PET, PPS, can be fireproof materials. Surface of aluminum or stainless steel or other metal materials can be not insulating or insulating via anodizing.

Figure 5:
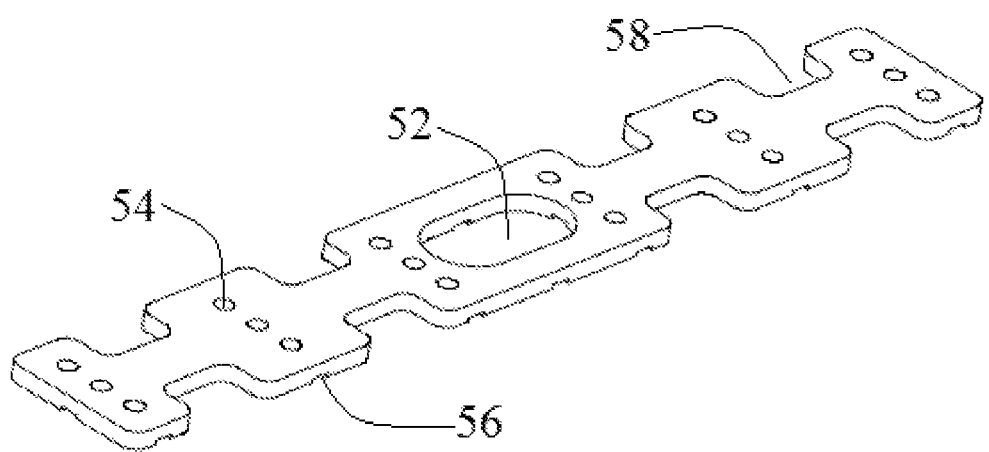
FIG. 5 depicts a perspective view of a first embodiment of a cell pallet of the secondary battery according to the present invention.
Figure 6:
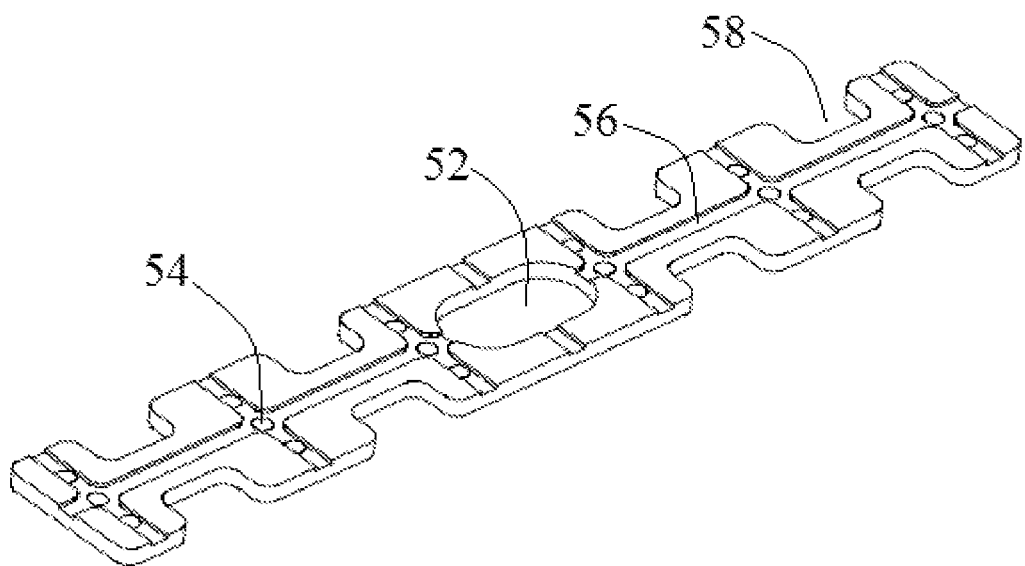
FIG. 6 depicts a bottom view of the cell pallet as shown in FIG. 5.

Referring to FIGS. 5 and 6, according to a first embodiment of the cell pallet 50, the cell pallet 50 is provided with a first through-hole 52 aligned with the explosion proof valve 14 of the housing 10 to facilitate explosion proof exhaust. In order to facilitate flow of liquid and gas, the cell pallet 50 is also provided with one or more second through-holes 54 which are distributed evenly in the cell pallet 50. The first through-hole 52 and the second through-hole 54 communicate the space above the cell pallet 50 with the space below the cell pallet 50, so that the electrolyte 60 and the gas generated inside the bare cell 30 can pass through the cell pallet 50 freely. At the same time, the lower surface of the cell pallet 50 is provided with a number of grooves 56 communicating with four side edges of the cell pallet 50, and the grooves 56 communicate all the second through-holes 54 with the first through-hole 52. In addition, at least one notch 58 for communicating the space above the cell pallet 50 with the space below the cell pallet 50 are defined at the side edges of the cell pallet 50. Thus, the electrolyte 60 deposited at the bottom of the housing 10 may be infiltrated to the anode and cathode plates of the bare cell 30 via the first through-hole 52, the second through-holes 54, and the notches 58. In nail penetration test of the secondary battery, the gas generated inside the bare cell 30 may be guided to the first through-hole 52 through the second through-holes 54 and the grooves 56, and finally exhausted through the explosion proof valve 14 of the housing 10.

Figure 7:
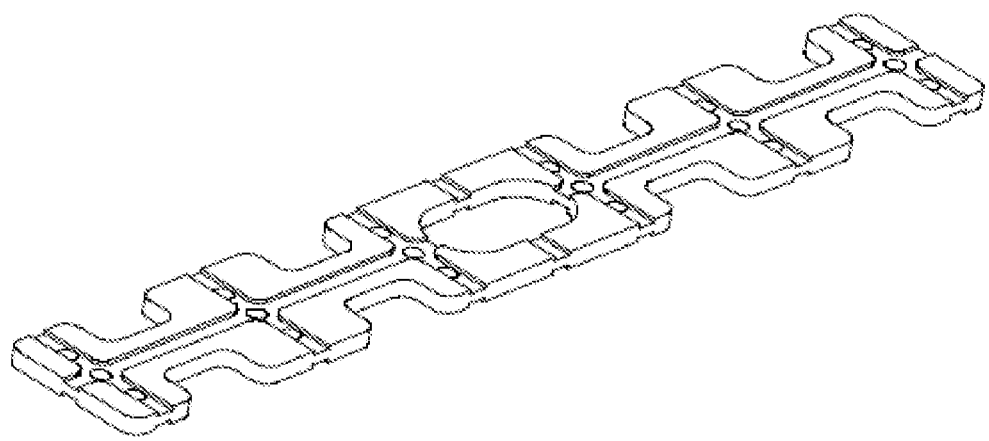
FIGS. 7 to 9 each depict a perspective view of different embodiments of the cell pallet as shown in FIG. 5.
Figure 8:
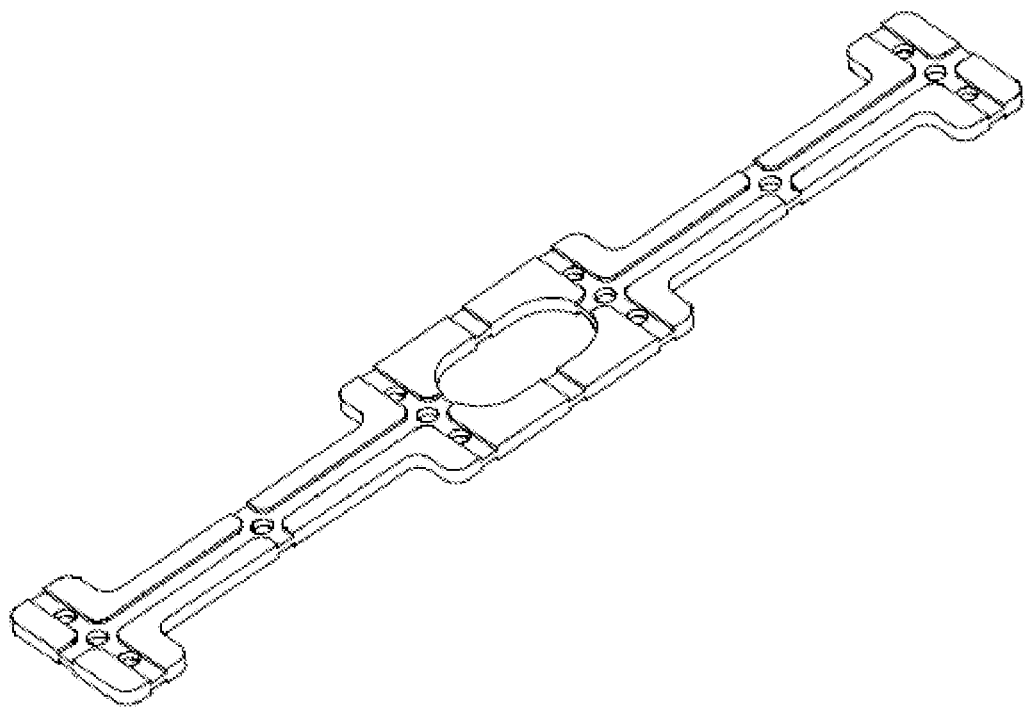
Figure 9:
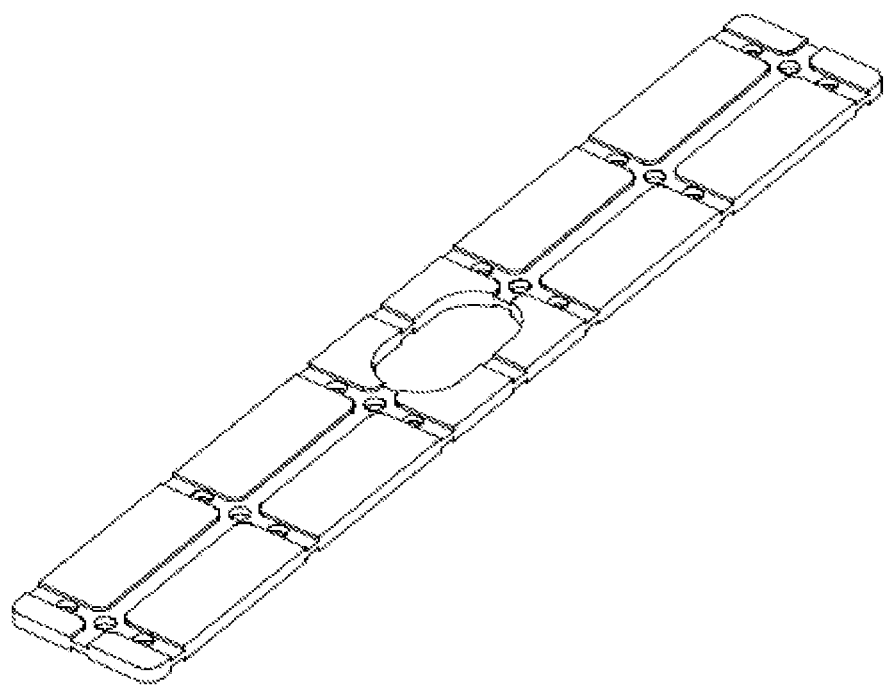

It should be understood that in various embodiments of the present invention, the cell pallet 50 may have one or more of the following structures: 1) The cell pallet 50 may be provided with the grooves 56 only on the lower surface thereof as shown in FIGS. 5 and 6, or be provided with the grooves on the upper and lower surfaces as shown in FIGS. 7 to 9; 2) The cell pallet 50 may be provided with notches 58 having different sizes and shapes as shown in FIGS. 5 to 8, may not be provided with a notch as shown in FIG. 9; 3) The shape, size and distribution of the second through-holes 54 can be adjusted according to the actual requirements. The second through-holes 54 should be distributed as uniformly as possible; 4) Although the first through-hole 52 has a kidney shape and the second through-hole 54 has a circular shape, as shown in FIGS. 5 to 9. According to other embodiments of the present invention, the first through-hole 52 and the second through-hole 54 may independently have a circle shape, an oblong shape, a rectangular shape, a square shape, or a triangular shape.

Figure 10:
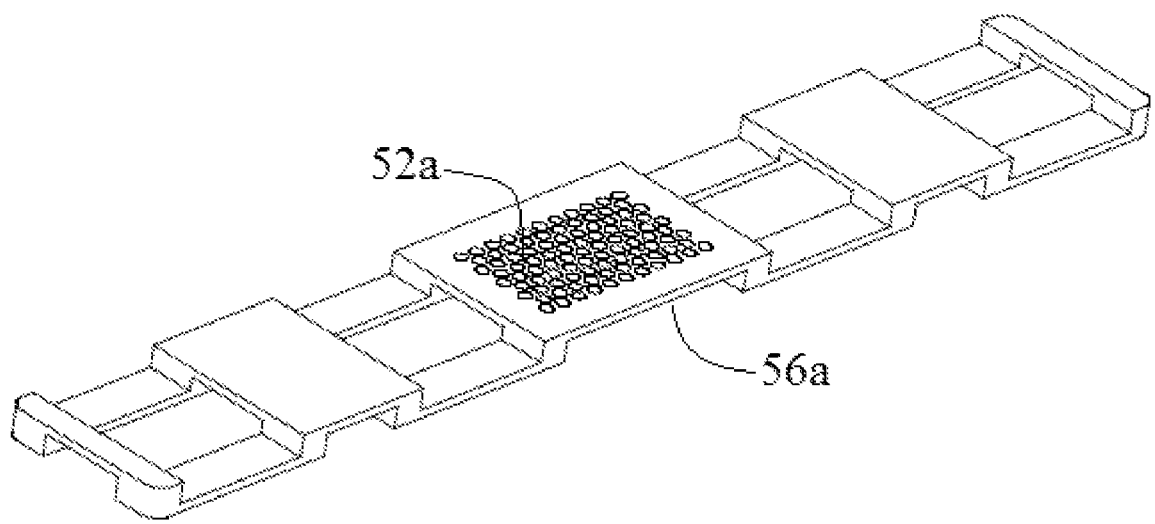
FIG. 10 depicts a perspective view of a second embodiment of a cell pallet of the secondary battery according to the present invention.
Figure 11:
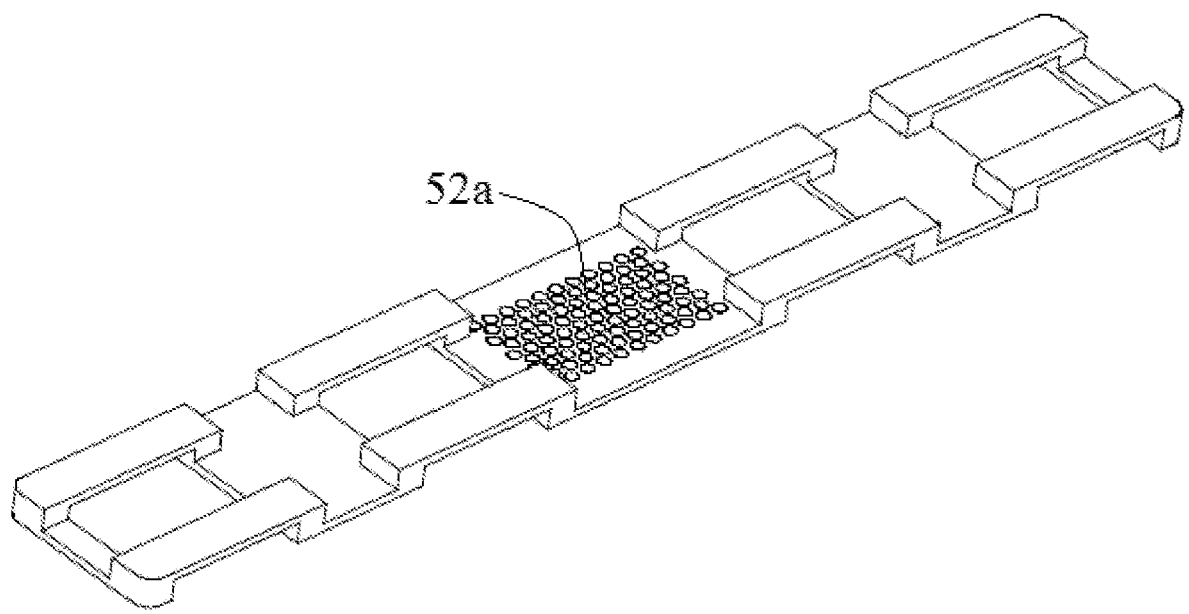
FIG. 11 depicts a bottom view of the cell pallet as shown in FIG. 10.

FIG. 10 and FIG. 11 depict a second embodiment of the cell pallet for use in the secondary battery according to the present invention. In order to prevent large particle sparks released from the explosion proof valve 14 from causing fire in abuse tests, such as nail penetration test, the first through-hole provided in the cell pallet corresponding to the explosion proof valve 14 is not a large through hole but a sieve net 52*a* having a number of sieve openings. Each sieve opening may have a kidney shape, a triangular shape, a circular shape, a square shape, or the like. The sieve openings can be arranged regularly to form gas channels. The size of each sieve openings is configured to be able to effectively block large particle sparks and ensure the safety of the battery in nail penetration test. For example, it is preferable that the sieve net 52*a* includes a number of kidney-shaped holes each having a length of 1 mm and a width of 0.5 mm arranged uniformly. The total area of all sieve openings in the sieve net 52*a* is 30 to 80% of the area of the explosion proof valve 14. In this case, when the battery is thermally out of control, the sieve net 52*a* can secure ventilation and prevent the high temperature solid particles and sparks from passing through the sieve net 52*a*, and further prevent combustible gas and high temperature solid particles from being sprayed outside of the explosion proof valve 14 and combusting in air, to significantly improve the safety performance of the secondary battery. In addition, all of the area of the cell pallet facing the explosion proof valve 14 which is aligned with the explosion proof valve 14 is hollowed out, that is, a groove 56*a* is formed in a lower surface of the cell pallet for covering the whole explosion proof valve 14. Two ends of the groove 56*a* are communicated to two longer side edges of the cell pallet, respectively, so as to increase the exhaust area.

Figure 12:
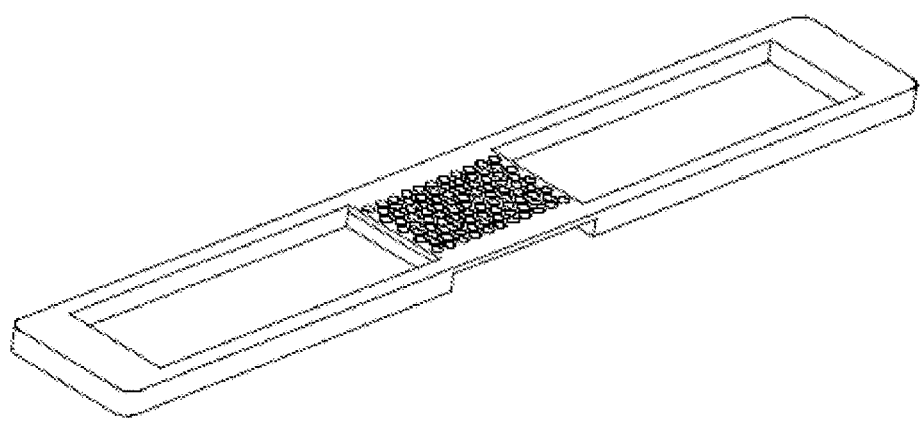
FIGS. 12 to 14 each depict a perspective view of different embodiments of the cell pallet as shown in FIG. 10.
Figure 13:
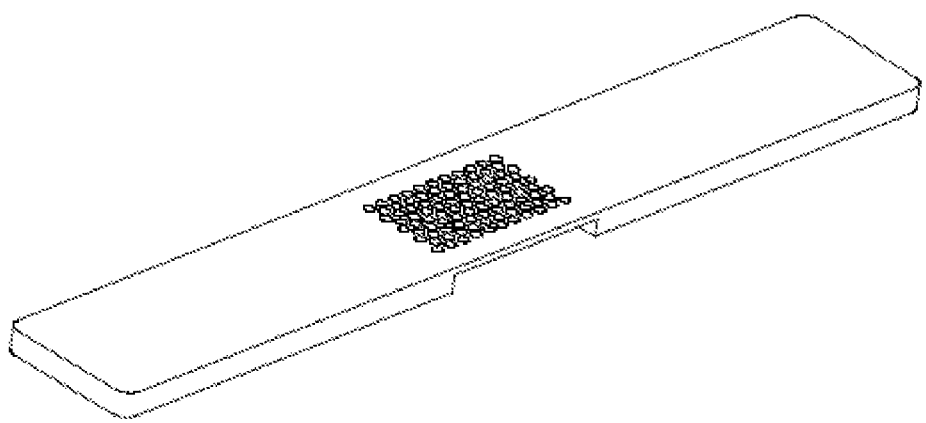
Figure 14:
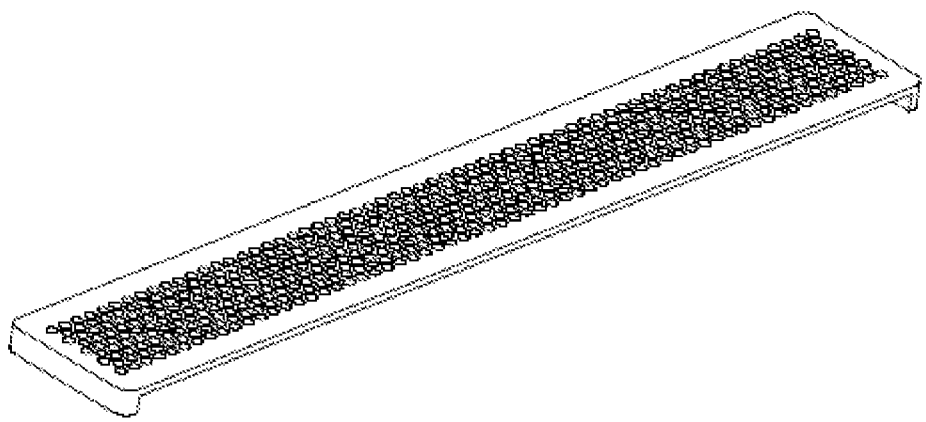

It should be understood that, in various embodiments of the present invention, the cell pallet having sieve net 52*a* shown in FIGS. 10 to 11 may also have one or more of the following structures: 1) The cell pallet may define a groove 56*a* in the upper and lower surfaces thereof as shown in FIGS. 10 to 12, or the cell pallet may only define a groove in the lower surface thereof as shown in FIGS. 13 to 14; 2) The sieve net may be provided only in the area corresponding to the explosion proof valve 14 as shown in FIGS. 10 to 13, or the sieve net may be provided in all areas as shown in FIG. 14.

Figure 15:
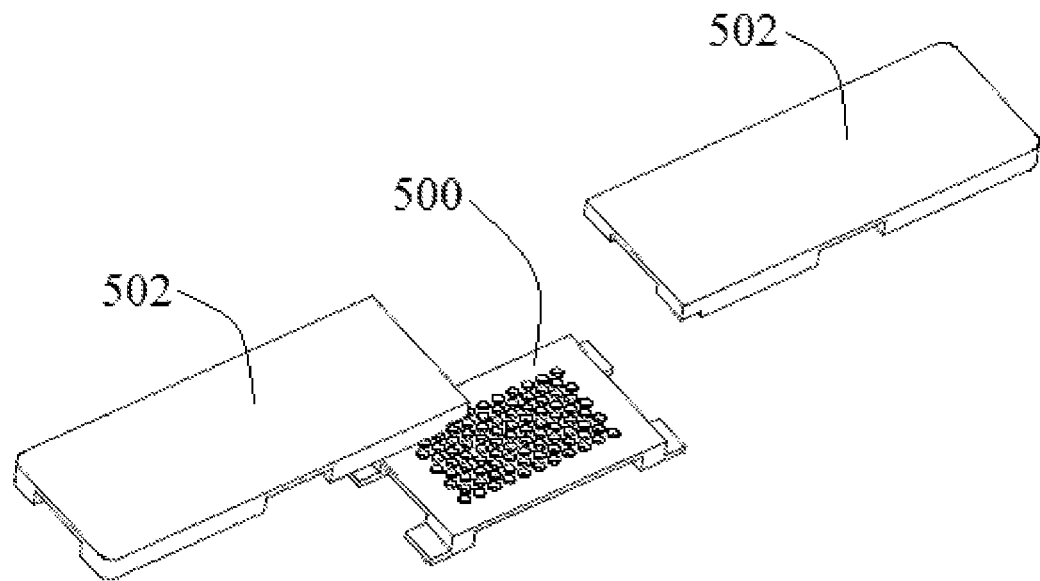
FIG. 15 depicts an exploded view of a third embodiment of a cell pallet of the secondary battery according to the present invention.
Figure 16:
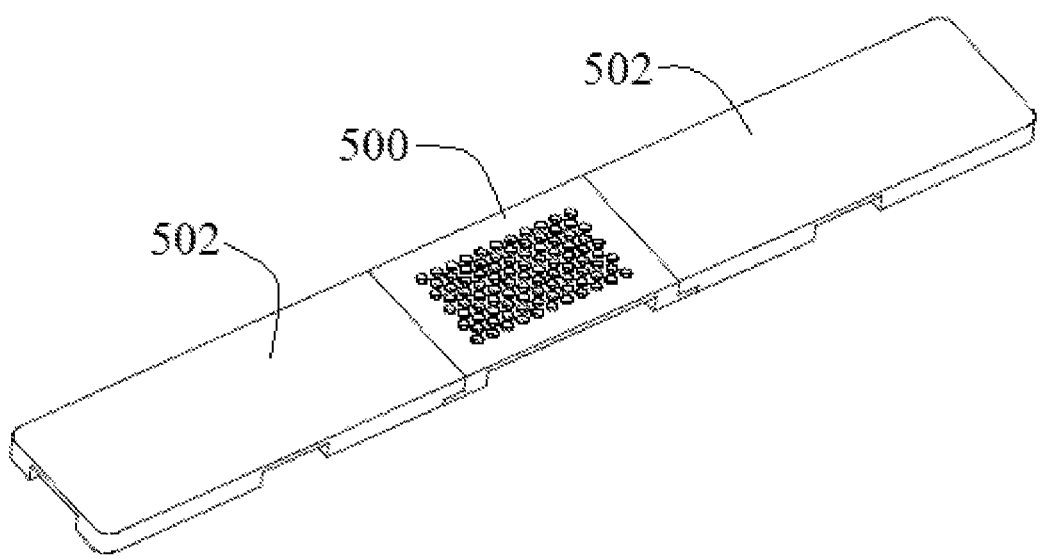
FIG. 16 depicts an assembled view of the cell pallet as shown in FIG. 15.

Although in the above embodiments, the cell pallet is an integral component made from a same material, the cell pallet can also be an assembly including separate subassemblies. Referring to FIGS. 15 and 16, a third embodiment of the cell pallet of the secondary battery according to the present invention includes an explosion proof component 500 aligned with the explosion proof valve 14 located at the middle thereof and two support components 502 located at two ends of the explosion proof component 500. The explosion proof component 500 is made from high temperature resistant materials, while the support components 502 are made from plastic materials. The explosion proof component 500 and the support components 502 are injection molded, or are connected to each other via hot-melt or cold-press process.

Figure 17:
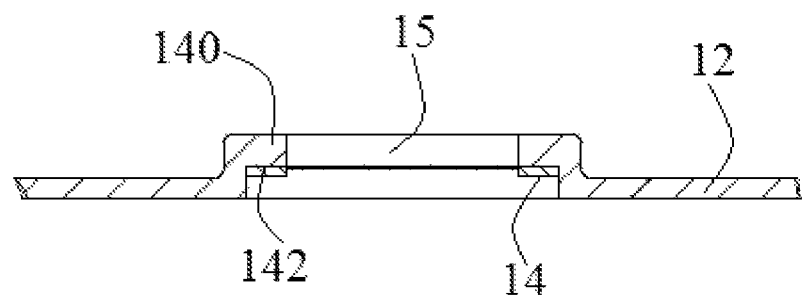
FIG. 17 depicts a partially cross-sectional view of a bottom of a housing of the secondary battery according to the present invention.

Referring to FIG. 17, in order to improve the reliability and the sealing performance of the explosion proof valve 14, the housing 10 may be provided with a convex hull 140 extending towards the cell pallet 50 corresponding to the position of the explosion proof valve hole 14. The top surface of the convex hull 140 is 0.3 to 5 mm higher than the inner surface of the bottom surface 12 of the housing 10. The explosion proof valve hole 15 is defined at the middle of the convex hull 140, and the outer surface of the convex hull 140 is provided with a counterbore 142 for fixing the explosion proof valve 14.

As can be seen from the foregoing description of the embodiments of the present invention, the secondary battery according to the present invention provides a cell pallet 50 under the bare cell 30. The cell pallet 50 defines corresponding holes, grooves and notches. The secondary battery of the present invention has the following advantages relative to the prior art.

1) The cell pallet 50 can effectively prevent the bottom of the bare cell 30 from interfering with rounded corners of the bottom of the housing 10;

2) The first through-hole, the second through-hole and the grooves of the cell pallet 50 can effectively guide the gas inside the secondary battery to the explosion proof valve 14, to prevent the secondary battery from exploding in nail penetration test;

3) The through-holes and the notches of the cell pallet 50 form a channel in communication with the anode and cathode plates for the electrolyte 60, thereby remarkably improving the injection efficiency of the secondary battery;

4) The sieve net can effectively block the large particle sparks, so as to ensure the safety of the secondary battery in nail penetration test;

5) The explosion proof valve 14 is provided at the bottom of the secondary battery, and the cell pallet 50 can be pressed directly under the bare cell 30. No welding process is needed;

6) The explosion proof valve 14 is provided at the bottom of the secondary battery and, therefore, the size of the cell pallet 50 is larger than that of a top bracket welded to the inside of the top cover 20, so as to obtain more sufficient exhaust area.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A secondary battery, comprising:
    a housing, the housing being provided with an explosion proof valve at a bottom thereof;
    a cell pallet received in the housing and located at a bottom of the housing, wherein the cell pallet is provided with a first through-hole, a second through-hole, and at least one groove, the first through-hole is aligned with the explosion proof valve and extends through the cell pallet to communicate a space above the cell pallet with a space below the cell pallet, the second through-hole is not aligned with the explosion proof valve and extends through the cell pallet to communicate the space above the cell pallet with the space below the cell pallet, and the at least one groove is provided on an upper surface or a lower surface of the cell pallet and extends along the upper surface or the lower surface, respectively, to connect the first through-hole with the second through-hole and further with at least one side edge of the cell pallet;
    a bare cell received in the housing and seated on the cell pallet; and
    a top cover assembled to a top side of the housing.

2. The secondary battery of claim 1, wherein the first through-hole is a through-hole aligned with the explosion proof valve, or a plurality of sieve openings aligned with the explosion proof valve.

3. The secondary battery of claim 1, wherein the at least one groove comprises a groove defined in the lower surface of the cell pallet and covering the whole explosion proof valve, wherein two ends of the groove communicate with two longer side edges of the cell pallet, respectively.

4. The secondary battery of claim 1, wherein the at least one groove comprises a plurality of grooves jointly communicating four side edges of the cell pallet with the first through-hole.

5. The secondary battery of claim 1, wherein at least one side edge of the cell pallet is provided with a notch for communicating the space above the cell pallet with the space below the cell pallet.

6. The secondary battery of claim 1, wherein the secondary battery further comprises an insulating film for separating the bare cell from the housing, a bottom of the insulating film is provided with a through opening, the cell pallet is interposed between the insulating film and the housing and serves as a support for the insulating film and the bare cell enclosed in the insulating film.

7. The secondary battery of claim 1, wherein the cell pallet is an integral component made from a same material or an assembly including separate subassemblies made from different materials, the assembly includes an explosion proof component aligned with the explosion proof valve located at a middle thereof and two support components at two ends of the explosion proof component, the explosion proof component is made from high-temperature resistant materials, and the support component is made from plastic materials.

8. The secondary battery of claim 1, wherein a bottom surface of the housing is provided with a convex hull extending towards the cell pallet, and an explosion proof valve hole is defined in a middle of the convex hull.

* * * * *